(12) United States Patent
Nicolas et al.

(10) Patent No.: US 7,040,870 B2
(45) Date of Patent: May 9, 2006

(54) GEAR PUMP WITH GEARS HAVING CURVED TEETH AND METHOD OF FEEDING ELASTOMERIC MATERIAL

(75) Inventors: Bernard Nicolas, Arlon (BE); Gary Robert Burg, Massion, OH (US); Malcolm George Marshall, Wadsworth, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 217 days.

(21) Appl. No.: 10/750,435

(22) Filed: Dec. 30, 2003

(65) Prior Publication Data

US 2005/0147518 A1    Jul. 7, 2005

(51) Int. Cl.
*F01C 1/16*    (2006.01)
(52) U.S. Cl. ............ 417/53; 417/410.4; 418/201.3
(58) Field of Classification Search ............ 417/410.4, 417/53; 418/206.5, 201.3, 201.1, 206.1, 418/75
See application file for complete search history.

(56) References Cited

U.S. PATENT DOCUMENTS

| | | | |
|---|---|---|---|
| 5,647 A | 6/1848 | Semple | |
| 1,702,860 A | 2/1929 | Bottcher | |
| 2,098,864 A | 11/1937 | Foster | |
| 2,982,221 A | 5/1961 | Whitfield | |
| 3,865,523 A | 2/1975 | Baehr | |
| 4,137,023 A | 1/1979 | Moked et al. | |
| 5,156,781 A | 10/1992 | Bohm et al. | |
| 5,267,847 A | 12/1993 | Bohm et al. | |
| 5,458,474 A | 10/1995 | Neubauer et al. | |
| 5,533,825 A | 7/1996 | Stone | |
| 5,636,550 A | 6/1997 | Deane | |
| 5,855,927 A | 1/1999 | Uth et al. | |
| 6,112,611 A | 9/2000 | Maki | |
| 6,210,139 B1 | 4/2001 | Ramanathan et al. | |
| 6,468,067 B1 * | 10/2002 | Ikegami | 425/209 |
| 2002/0071337 A1 | 6/2002 | Hepke | |

FOREIGN PATENT DOCUMENTS

| | | |
|---|---|---|
| DE | 101 48 476 A 1 | 4/2003 |
| EP | 0 492 425 A1 | 7/1992 |
| EP | 0 812 988 A1 | 6/1997 |

OTHER PUBLICATIONS

European Search Report—Dated Apr. 29, 2005—4 pages.

* cited by examiner

*Primary Examiner*—Charles G. Freay
(74) *Attorney, Agent, or Firm*—Brouse McDowell; Roger D. Emerson; Heather M. Barnes

(57) ABSTRACT

A gear pump and method for pumping elastomeric material having two gears with meshing herringbone gear teeth. Each of the gear teeth has helical side portions and a curved central portion which extends circumferentially of the gear a distance equal to at least one half the pitch of the gear teeth to provide a continuous squeezing contact between the teeth of the two gears for pumping a uniform strip of elastomeric material from the gear pump.

6 Claims, 3 Drawing Sheets

GEAR PUMP WITH GEARS HAVING CURVED TEETH AND METHOD OF FEEDING ELASTOMERIC MATERIAL

BACKGROUND OF THE INVENTION

1. Field of Invention

This invention relates to a gear pump for feeding an elastomeric material to a die providing components for building a tire. The gear pump of this invention is especially useful in minimizing the temperature differential across the face of the gears and avoiding pressure spikes experienced with herringbone gear teeth. The pumped material is also metered without causing pulsations such as those experienced during unloading a gear pump with spur gear teeth.

2. Description of the Related Art

Gear pumps such as those shown in U.S. Pat. No. 5,267,847 have been proposed for extruding strips of rubber for tire components wherein the gears are spur gears. The spur gears have caused the rubber to be ejected from the gear pump with pulsations corresponding to the pumping action of the axially oriented spaced gear teeth. This results in extruded components which are not uniform and do not meet the specifications for building tires.

It has also been proposed to use helical gears in a gear pump to reduce the pulsations. However, the elastomeric material is pushed to one side resulting in a product which is heavy on one side and with a higher temperature on one side than on the other side. This temperature differential is not desirable because the viscosity of the rubber will then be greater on one side resulting in a non-uniform extrusion of the component.

A no-backlash gearing mechanism such as that described in U.S. Pat. No. 5,636,550 has been proposed for eliminating backlash in a gear drive chain. Intermeshing gears having curved teeth have also been proposed for adjacent shafts in U.S. Pat. No. 5,533,825. However, there is no teaching or showing of utilizing curved gear teeth in a gear pump.

Gear pumps with gears having herringbone teeth are shown in U.S. Pat. No. 4,137,023. The teeth are joined at sharp central edges which cause high pressure spikes resulting in an increase in temperature of the elastomeric material at the central portions of the component which may produce a non-uniform component. Gear pumps for melted synthetic thermoplastic material are shown and described in U.S. Pat. No. 5,458,474 however, the gear teeth are herringbone shaped and have the sharp central edges which cause pressure spikes.

SUMMARY OF THE INVENTION

In accordance with this invention a gear pump is provided having a metering chamber containing a pair of herringbone gears with each of the gear teeth having a curved central portion. The direction of rotation of the gears is such that the portion of each tooth closest to the center is the first portion of each tooth to enter into engagement. In this way the elastomeric material is squeezed out of the space between the teeth as the gears rotate and that space between the inlet chamber and outlet chamber is closed.

In order for the elastomeric material to be squeezed without being damaged by excessive pressure the herringbone gears are provided with curved central portions which have a circumferential width equal to at least one half the pitch of the gear teeth. Accordingly, when the gear teeth of the opposing gears come together there is a gradual closing of the space between the gear teeth for diverting the pumped material towards the outlet chamber in the gear pump housing. In this way there is a gradual unloading of the material between the gear teeth as the gears rotate past the outlet chamber in the gear pump housing. Also, the pinching or pulsating flow of the material is minimized significantly.

In accordance with one aspect of the invention there are provided a gear for a gear pump having an inlet chamber, a metering chamber and an outlet chamber. The gear is located in the metering chamber and has a plurality of herringbone gear teeth spaced apart at a predetermined pitch, each of the gear teeth having helical side portions and a curved central portion connecting the side portions whereby material conveyed by the gear pump is smoothly squeezed in the space between the gear teeth at the curved portion of each of the gear teeth and then moved axially outward and over the gear teeth into the outlet chamber.

In accordance with another aspect of the invention there is provided a gear pump for feeding elastomeric material to a die providing components for building a tire, the gear pump having a housing with an inlet chamber, a metering chamber and an outlet chamber, a pair of gears rotatably mounted in the metering chamber with each of the gears having a plurality of herringbone gear teeth spaced apart at a predetermined pitch for meshing engagement with gear teeth of the other of the gears, each of the gear teeth having helical side portions and a curved central portion connecting the side portions, and means for rotating the gears to carry the elastomeric material from the inlet chamber through the metering chamber into the outlet chamber and for sealing the space between the outlet chamber and the inlet chamber upon meshing engagement of the gear teeth of the pair of gears.

In accordance with a further aspect of the invention there is provided a method of pumping elastomeric material through a gear pump having an inlet chamber, an outlet chamber and a metering chamber, a pair of gears having herringbone gear teeth disposed in said metering chamber at a predetermined pitch, each of the teeth having helical side portions and a curved central portion comprising feeding the material under pressure into the inlet chamber, rotating the gears to convey the material through the metering chamber into the outlet chamber and smoothly squeezing the material out of the space between the meshing gear teeth at the curved central portion and then over the gear teeth into the outlet chamber as the gear teeth seal the space between the outlet chamber and the inlet chamber.

DESCRIPTION OF THE EMBODIMENT

Figure 1:
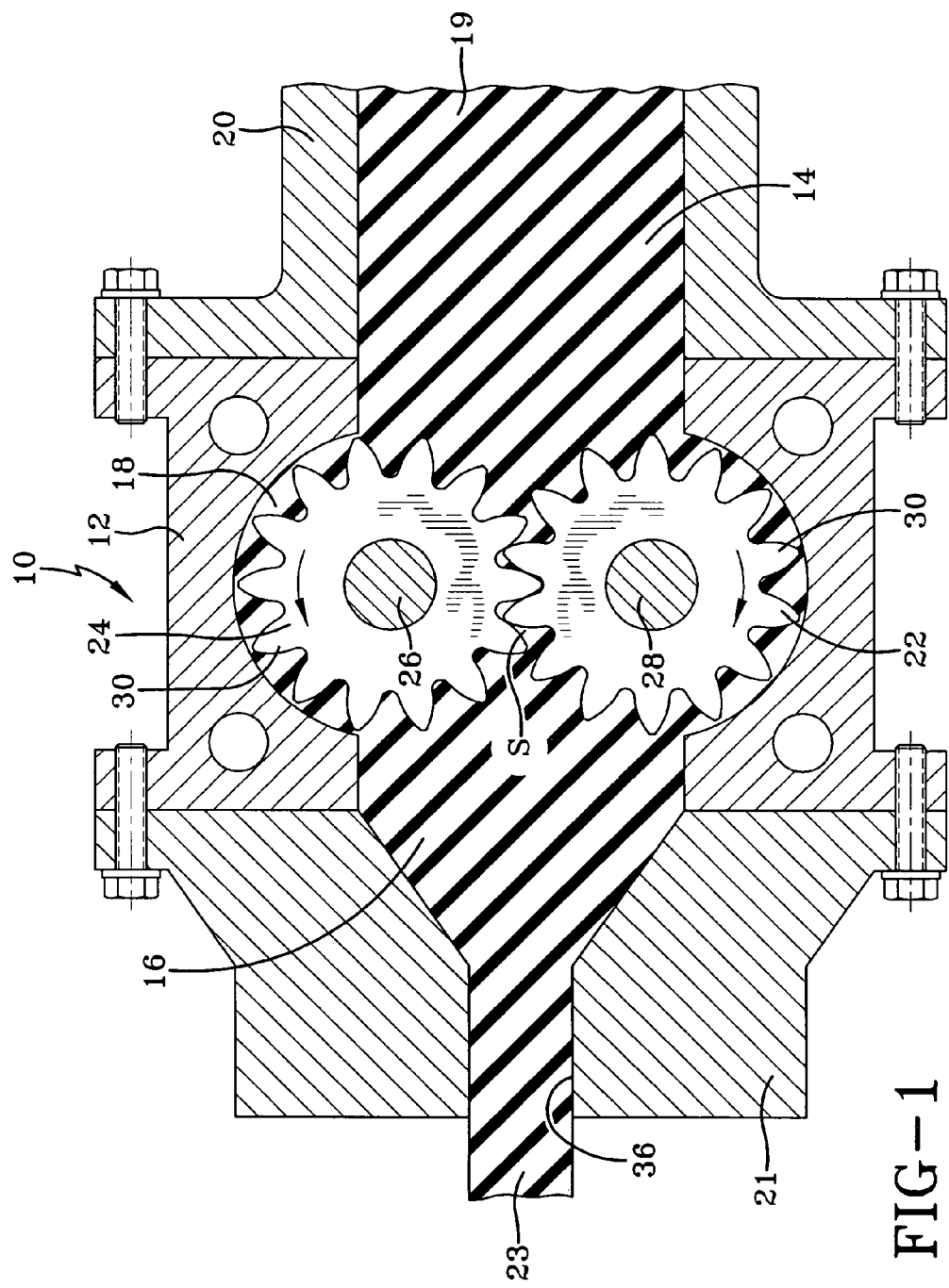
FIG. 1 is an elevation in section of a gear pump embodying the invention.

Referring now to the drawings wherein the showings are for the purpose of illustrating a preferred embodiment of the invention only and not for the purpose of limiting the same, FIG. 1 is a cross sectional view of a gear pump 10 having a housing 12 containing an inlet chamber 14, an outlet chamber 16, and a metering chamber 18. The housing 12 may be connected to a source for supplying elastomeric material 19 such as an extruder 20 (not shown) at the inlet chamber. The outlet chamber 16 may also be in communication with a shaping member such as a die 21 or other non-resilient means for shaping a tire component 23. Mounted in the housing 12 are two gears 22,24 in meshing engagement. The gears 22,24 have shafts 26,28 rotatably mounted in the housing 12 and one of the shafts, or both shafts, may be driven to rotate the gears 22,24 in such a manner as to carry the elastomeric material 19 fed into the inlet chamber 14 through the metering chamber 18 into the outlet chamber 16.

Figure 2:
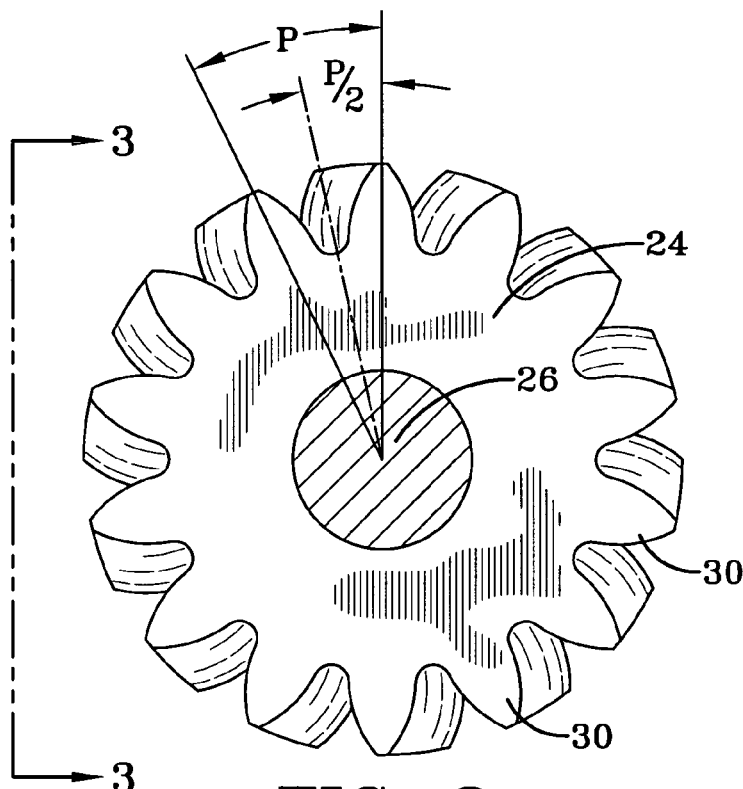
FIG. 2 is an enlarged end view of one of the gears shown in FIG. 1.
Figure 3:
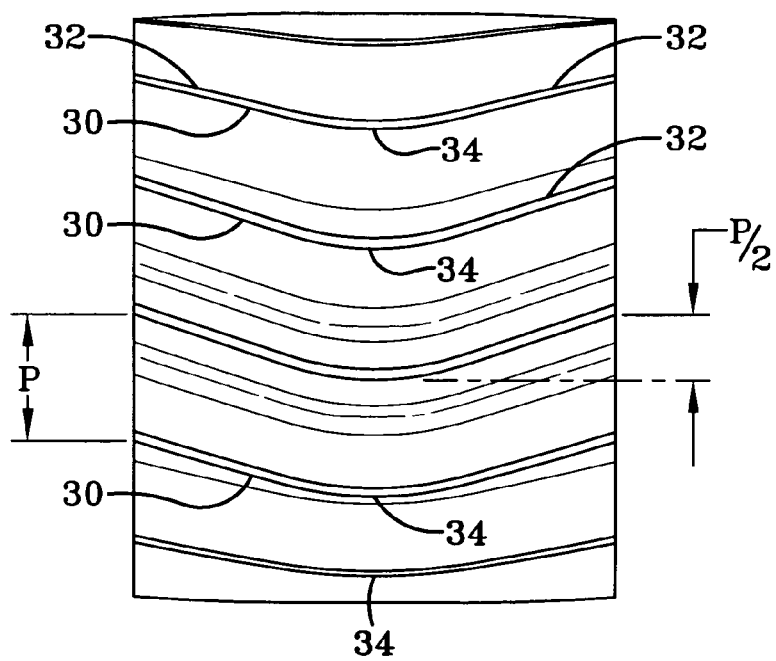
FIG. 3 is a side view of the gear taken along the plane of line 3—3 in FIG. 2.
Figure 4:
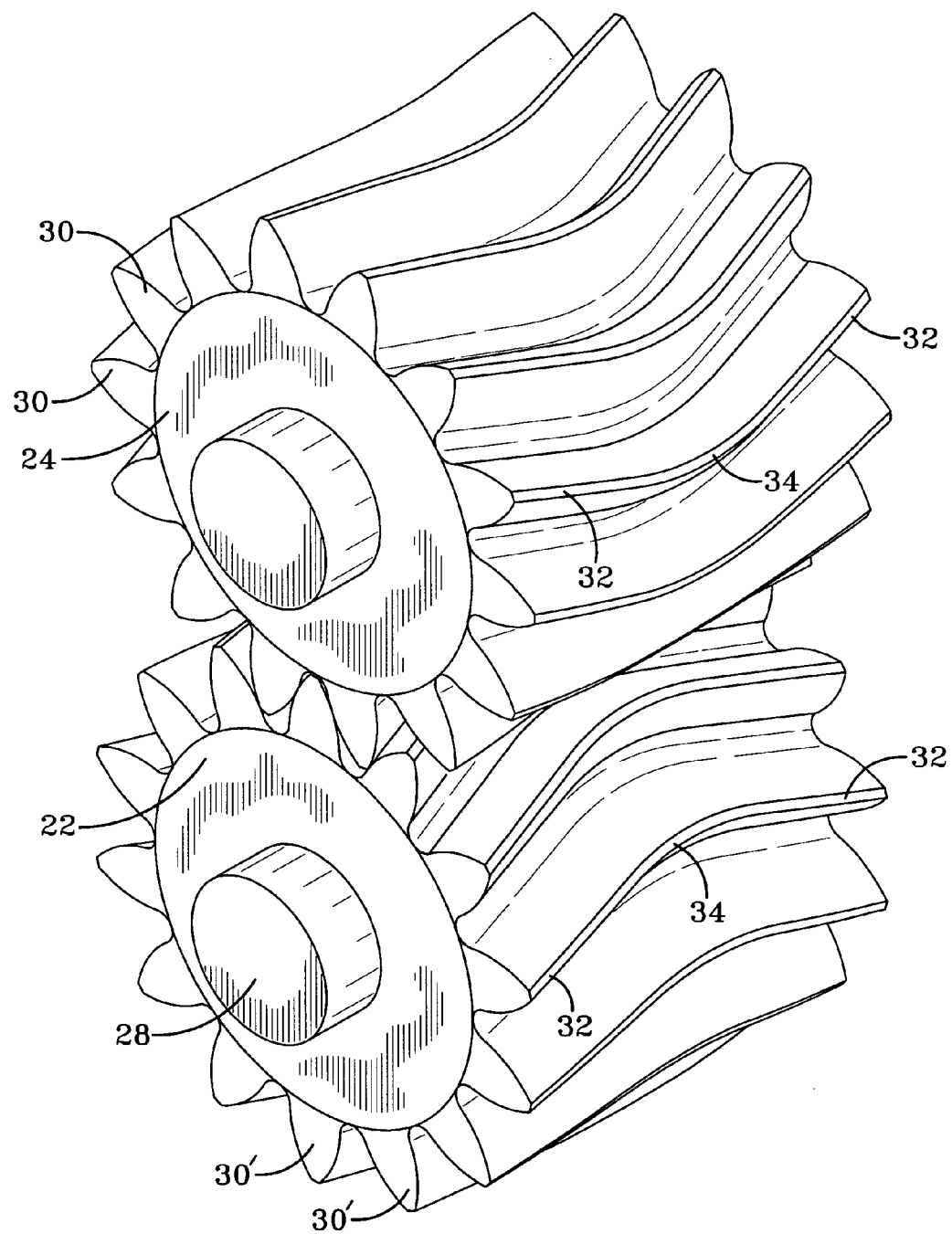
FIG. 4 is a perspective view of the gears in meshing engagement with parts being broken away.

Referring to FIGS. 2, 3 and 4 the gears 22,24 are shown in greater detail. A plurality of herringbone teeth 30, 30' are spaced circumferentially around the circumference of the gears 22, 24. Each of the teeth 30, 30' is of a generally herringbone shape having helix side portions 32 and a curved central portion 34. As shown in FIGS. 2 and 3 the teeth 30 are spaced apart a predetermined pitch P. The curved central portion 34 extends circumferentially of the gear a distance P/2 equal to at least ½ the pitch P of the teeth 30. Accordingly, when the gears 24 and 22 are in meshing engagement the teeth 30, 30' will be in continuous contact and provide a smooth continuous squeezing of the elastic material 19 out of the spaces S between the teeth as shown in FIG. 1. The elastomeric material 19 is not overheated and maintains a substantially uniform temperature as it is moved through the outlet chamber 16 into a die channel 36 of the die 21.

As shown in FIG. 1 the elastomeric material 19 is carried by teeth 30 of the upper gear 24 and teeth 30' of the lower gear 22 through the metering chamber 18 into the outlet chamber 16. The elastomeric material 19 between the teeth 30 and 30' is squeezed out of the grooves between the teeth sealing the spaces between the gears 22 and 24. The pressure in the outlet chamber 16 then moves the elastomeric material through the die 21 and die channel 36 forming a tire component for building a tire. The pressure can be controlled by the speed of rotation of the gears 22 and 24.

The elastomeric material 19 supplied to the gear pump 10 may be provided by the extruder 20 being rotatable at a speed which provide sufficient material at a predetermined pressure to fill the inlet chamber 14 and the spaces between the teeth 30, 30'.

The gear teeth 30 and 30' may have transverse sections as shown in FIG. 1 identical to the transverse sections of standard spur gears used for gear pumps. The central portion 34 of the gear teeth 30, 30' may be generated by rotating a transverse section along an axis of each of the teeth 30,30'.

A preferred embodiment has been described hereinabove. It will be apparent to those skilled in the art that the above apparatus may incorporate changes and modifications without departing from the general scope of this invention. It is intended to include all such modifications and alterations insofar as they come within the scope of the appended claims or the equivalents thereof.

We claim:

1. A gear for a gear pump having an inlet chamber, a metering chamber and an outlet chamber, said gear being located in said metering chamber and having a pair of herringbone gear teeth spaced apart at a predetermined pitch, each of said gear teeth having helical side portions and a curved central portion connecting said side portions whereby material conveyed by said gear pump is smoothly squeezed out of the space between said gear teeth at said curved portion of each of said teeth and then moved axially outward and over said gear teeth into said outlet chamber, wherein each said curved central portion extends circumferentially of said gear a distance equal to at least one half said predetermined pitch.

2. The gear of claim 1 further comprising said curved central portion of each of said teeth being generated by rotating a transverse section along an axis of each of said teeth.

3. A gear pump for feeding elastomeric material to a die providing components for building a tire, said gear pump having a housing with an inlet chamber, a metering chamber and an outlet chamber, a pair of gears rotatably mounted in said metering chamber with each of said gears having a plurality of herringbone gear teeth spaced apart at a predetermined pitch for meshing engagement with gear teeth of the other of said gears, each of said gear teeth having helical side portions and a curved central portion connecting said side portions, said curved central portion of each of said teeth being generated by rotating a transverse section along an axis of each of said teeth, and means for rotating said gears to carry said elastomeric material from said inlet chamber through said metering chamber into said outlet chamber and for sealing the space between said outlet chamber and said inlet chamber upon said meshing engagement of said gear teeth of said pair of gears.

4. The gear pump of claim 3 further comprising an inlet opening in said inlet chamber for receiving said elastomeric material to fill said inlet chamber during operation of said gear pump.

5. The gear pump of claim 4 further comprising a die channel in said die for supplying elastomeric material of a desired cross section.

6. A method of pumping elastomeric material through a gear pump having an inlet chamber, an outlet chamber and a metering chamber, a pair of gears having herringbone gear teeth disposed in said metering chamber at a predetermined pitch, each of said teeth having helical side portions and a curved central portion comprising feeding said material under pressure into said inlet chamber, rotating said gears to convey said material through said metering chamber into said outlet chamber and smoothly squeezing said material out of the space between said meshing gear teeth at said curved central portion of each of said gears and then over said gear teeth into said outlet chamber as said gear teeth seal the space between said outlet chamber and said inlet chamber, wherein said herringbone gear teeth of each of said gears being spaced apart a predetermined pitch for meshing engagement and said curved central portion of each of said teeth extending circumferentially of said gear a distance equal to at least one half said predetermined pitch for providing a continuous squeezing contact between the teeth of said pair of gears as they rotate to supply said material to said outlet chamber.

* * * * *